REGENERATIVE SHIFT REGISTER

Filed Jan. 20, 1955

INVENTOR.
JOHN PAUL JONES
BY George Baron
ATTORNEY

United States Patent Office 2,876,438

Patented Mar. 3, 1959

2,876,438

REGENERATIVE SHIFT REGISTER

John Paul Jones, Pottstown, Pa., assignor to Burroughs Corporation, Detroit, Mich., a corporation of Michigan Application January 20, 1955, Serial No. 483,027

10 Claims. (Cl. 340—174)

This invention relates to pulse transfer circuits and more particularly to the transfer of binary pulses within magnetic binary shift registers.

Magnetic cores having a rectangular hysteresis loop characteristic play a prominent part as components in high-speed computing devices because of their relative simplicity of operation, construction, and low cost. Because of this hysteresis characteristic binary information can be stored in a magnetic element or core by the flux direction of the magnetism remaining in the core after the core has been cut by a magnetic field of a predetermined minimum strength. The stored information in the core can be transferred or shifted to another magnetic core. In early teachings of computers employing binary cores, a signal was required to actuate a core, and thus store information in said core. At some time later it was necessary to send another signal of the proper polarity to the same core in order to transfer or read out said stored signal. In such a system of storage and transfer of information, two magnetic cores are required for each binary digit or bit of information and two sequential actuating pulses, each applied to a different core, are required to shift each bit of binary information along a shift register.

The above noted method of switching and transferring information is referred to in the magnetic art as a "two core per bit" system because separate cores are needed to read in and read out a single bit of information at different times.

The present invention affords a single core per bit shift register system instead of a two core per bit shift register. A single core per bit system generally requires an initiation, by an advancing pulse, of the clearance of information in a core and the reading out or interrogation of the stored information in a preceding core into the cleared core without the need of an additional advancing pulse. In obtaining the advantage of a single core per bit in a shift register, a delay must be inserted in the shift register circuit. The advancing pulse will switch the cores of an array so that when all the cores are being cleared simultaneously it is necessary to delay the transfer of information from one core to the next core until the next core has completely switched.

Delay circuits employed in a one core per bit shift register have been found unsatisfactory because the delay circuits must store enough energy to drive the transferee core. Generally a power diode is necessary to maintain current flow in a given direction so as to shift the transferee core into the proper state. Moreover, the delay circuit, by being coupled to the winding of the transferee core, will transmit its energy into a low impedance magnetic core winding, and the delay circuit must be discharged immediately to retain enough energy to switch a core.

This invention overcomes the drawbacks inherent in prior delay circuits by providing a novel combination of a transistor circuit and a delay circuit so that the overall power expended in transferring the information from one core to another in a one core per bit shift register is substantially decreased. Moreover, the transfer of information from one core to the next is accomplished in such a manner that the delay circuit output does not itself drive the transferee core winding but triggers a regenerative circuit. This type of transfer has certain advantages, particularly in computer circuits designed for the solution of logical problems, which will be discused more fully in the subsequent description of the details of the invention.

Accordingly it is an object of my invention to provide an improved one core per bit shift register having negligible power losses.

A further object is to provide a novel transfer circuit between two binary magnetic cores so as to form a highly efficient basic building block for use in logical circuitry.

A still further object is to provide a novel circuit employing a regenerative circuit and a delay device in such a manner as to expedite as well as to cut down energy losses in the transfer of information from one core to another.

Yet another object is to employ a transistor and delay means in a novel circuit whereby the delay means triggers a transistor so that the latter rather than the former will be the core switching mechanism.

For a better understanding of my invention, together with further objects and advantages thereof, reference should be had to the following description taken in conjunction with the accompanying drawings, wherein.

Figure 1:
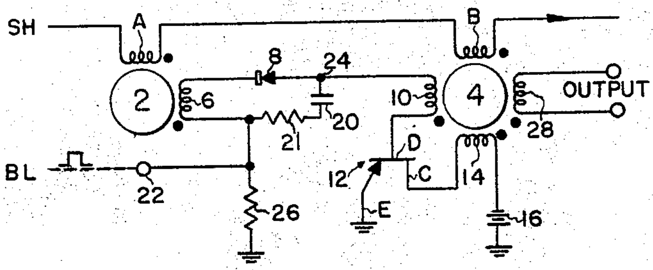
Fig. 1 is a schematic diagram of a circuit embodying the invention employed in a one core per bit shift register.

Referring now to Fig. 1 of the drawings, there is shown a conductor SH which, in a shift register such as may be employed in a binary computer device, carries pulses for advancing the information from one core to another core of an array of magnetic cores. It will be assumed that in Figures 1 and 3 of the present application conventional current flow into the non-dot terminal of a core winding will drive the associated core to the reference or "zero" state. Hence, when in Fig. 1 an advancing pulse through conductor SH (with current flow from left to right in the direction of the arrow) arrives at windings A and B at a specified time $T_1$ such pulse is effective to shift the cores 2 and 4 to the reference or "zero" state. It is desired, in a one core per bit shift register, to effectuate a complete shift of information with one advancing pulse, namely, to read out the information stored in core 2, which may be considered the transferor core and to read this information into core 4, which may be considered the transferee core. Since core 4 must be cleared of its stored information by the same advancing pulse that clears core 2 of its stored information, it is necessary to delay the transfer of information from core 2 to core 4 until core 4 has been completely switched by the advancing pulse in winding B.

When core 2 is switched by the advancing pulse in winding A, output winding 6 is cut by a magnetic flux field so as to induce a voltage across the output winding 6 which is negative at the dot end thereof. A series circuit which includes output winding 6 may be traced through a rectifier or unidirectional conductor 8, trigger winding 10, the base-emitter junction of transistor 12, ground and resistor 26. In parallel with a portion of this circuit is capacitor 20 and resistor 21, connected across the rectifier 8 and output winding 6. The transistor collector circuit includes a ground, D. C. source 16, switching or read-in winding 14, the internal collector-emitter impedance of transistor 12 and ground.

Simultaneously with the transmission of a shifting pulse along conductor SH, a positive blanking or blocking pulse is applied at input terminal 22. The shifting pulses and blanking pulses may be generated from the same source, though this is not necessary. The amplitude of the positive blanking pulse at terminal 22 is larger than the voltage induced in output winding 6 of core 2 in response to the switching of the core. Thus, the sum of the voltages between point 24 and ground is such that the net voltage applied across the base-to-emitter junction of transistor 12 is positive and such as to bias the transistor 12 beyond cut-off during the period that cores 2 and 4 are cleared by advance pulses through windings A and B, respectively. Since transistor 12 is cut off, the voltage induced in output winding 6 when core 2 switches, being negative at the dot end, will drive current through the diode 8 and will charge capacitor 20, such charge being stored in capacitor 20 since the transistor is biased beyond cut-off, and the rectifier 8 will not permit the capacitor 20 to discharge appreciable current through its high back impedance. When cores 2 and 4 have been cleared by advance pulses at windings A and B, respectively, blanking pulse 22 is terminated, removing the positive bias from the base-emitter junction of transistor 12. The base D of transistor 12 goes negative relative to the emitter E and capacitor 20 then discharges through the resistor 21, resistor 26, ground emitter electrode E, base D of transistor 12, trigger winding 10, entering the latter at its non-dotted terminal, and back to capacitor 20. As soon as transistor 12 is triggered into conduction, current flows from ground, through emitter electrode E, base D, collector C, switching winding 14, entering the latter at its dotted terminal, through battery 16, and back to ground, initiating the switching of core 4 toward its "1" state. The amplified current emanating from D.-C. source 16 and entering switching winding 14 through its dotted terminal will switch core 4 toward its "1" state, such switching inducing a positive potential at the dotted terminal of trigger winding 10 so as to maintain a negative potential at the base D of the transistor 12. The presence of a negative potential at the base D of transistor 12 maintains transistor 12 conducting. Consequently the regenerative coupling of trigger winding 10 and switching winding 14 assures the switching of core 4 once the transistor has been triggered into conductivity. Once core 4 has completed switching, the regenerative cycle of the transistor circuit terminates and the transistor 12 cuts off. Upon the switching of core 4 an output signal is obtained in the winding 28 of enough energy to supply potential to a similar delay circuit as the one described above.

Figure 2:
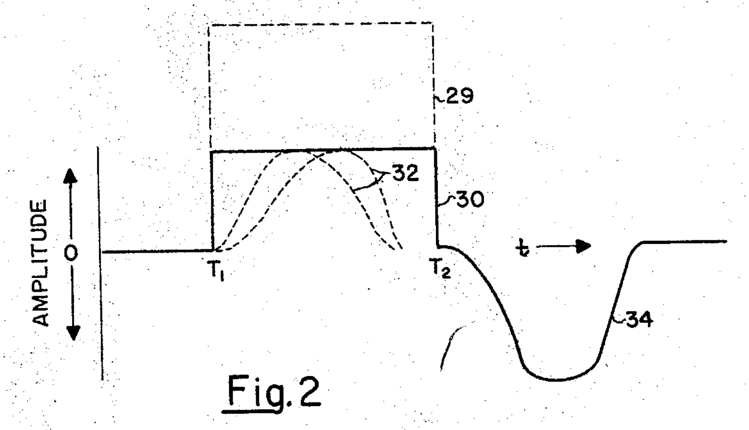
Fig. 2 is a pulse-time diagram for aiding in the understanding of the operation of the embodiment of Fig. 1.

Reference is now made to Fig. 2 for a more detailed explanation of the operation of the circuit of Fig. 1. At time $T_1$ a shifting pulse 29 is applied to windings A and B to shift cores 2 and 4, respectively. Coincidentally at time $T_1$, blanking pulse 30 is applied to at input terminal 22 to bias transistor 12 beyond cut-off. Assume that the time interval $T_2—T_1$ represents the period that the pulse is effective in cutting off the operation of transistor 12. The information in core 2 is read out into the capacitor 20 during the interval $T_2—T_1$ by means of pulses induced in output winding 6 as shown by curves 32. The binary information is read into core 4 from core 2 at the termination of the blanking pulse 30 when the transistor 12 is permitted to conduct. The read-in pulse 34 switches core 4 when the blanking pulse 30 is removed from the transistor circuit so that the potential stored in capacitor 20 can trigger the transistor 12.

The current flow through the transistor 12 is used during read-in of binary information to core 4. Read-out of binary information from all cores is accomplished by current flow through the windings A and B. If core 4, for example, switches in response to the shift current through its winding B, a voltage is induced in its input winding 10 which is of a positive polarity at the non-dot end thereof; hence, transistor 12 is biased off during read-out. Thus the information stored in capacitor 20 and represented by a negative potential at point 24 is always looking into the high input impedance of the cut-off transistor rather than into the low impedance of a magnetic core winding. In this manner information may be read to other circuits as detected from capacitor 20 in the form of a potential at terminal 24 without switching core 4. The capacity may be slightly increased to suit the number of circuits coupled to capacitor 20 so that information stored as a charge on capacitor 20 is not permitted to leak off before the blanking pulse 22 is removed. These additional circuits coupled to terminal 24 may be various logical sections of a complex computing system.

Another advantage lies in the fact that information can be read in at capacitor 20 at any time before the blanking pulse 30 expires and permits the transistor 12 to be triggered. The circuit consequently has the advantage of not depending on a critical time of arrival of an information pulse at capacitor 20.

The transfer circuit set out in Fig. 1 suffers negligible losses of power because the energy for switching a core is not stored in the capacitor 20 to be released through a high current winding to switch a core. The stored information always looks into a high impedance transistor circuit, and thus a highly stable information transfer circuit is produced.

A not insignificant aspect of this invention also lies in the fact that relatively poor magnetic cores can be used in the transfer and delay system set out herein. Cores having a squareness ratio as low as 0.7 have been found acceptable in a circuit employing this invention. The regenerative transistor circuit insures the complete switching of a core once the read-out information which has been stored in capacitor 20 triggers transistor 12. The transistors, like the cores, need not have critical tolerances.

Figure 3:
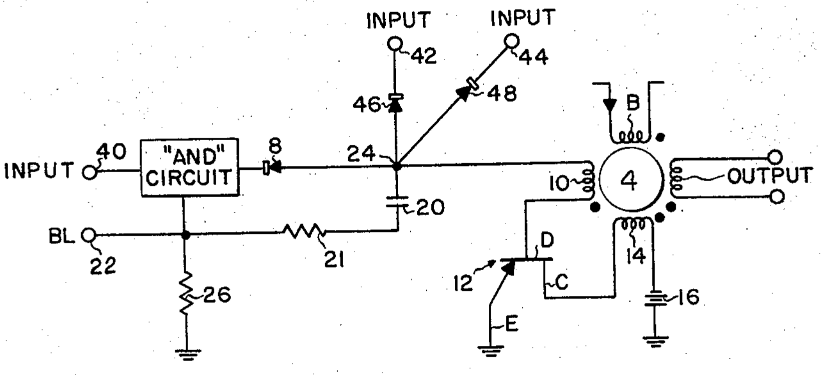
Fig. 3 is a schematic diagram, partially in block form, of a circuit employed in accordance with the invention for performing logical operations.

Fig. 3 discloses the application of the instant invention to a computer circuit of the type generally designed to solve logic problems. Input terminals 40, 42, and 44 into junction 24 represent the connection of different types of "and" or "or" circuits of a computer device to a core 4 by means of the teachings of the present invention. Input signals at the terminals 40, 42, and 44, due to the polarity of diodes 8, 46, and 48, will place a negative potential at junction 24. The presence of an input signal at any one or all of the terminals 40, 42, and 44 will cause a negative potential to be stored in capacitor 20 as long as the blanking pulse 30 is present to bias transistor 12 beyond cut-off. Once the transistor bias is removed, the information stored in capacitor 20 as a negative potential leaks off through winding 10 to trigger transistor 12 and shift core 4 in the manner hereinbefore described. The discharge path for capacitor 20 comprises the positively charged electrode of capacitor 20, resistors 21 and 26, ground, emitter electrode E, base D, winding 10, and the negatively charged electrode of capacitor 20. Thus it can be seen that any time during the presence of the blanking pulse 30 to bias the transistor 12 one may read in bits of information from a number of circuits to junction 24, and therefore there need be no critical regard for the time of arrival of said bits of information into junction 24. The transistor 12 is an amplifying device and in accordance with the teaching of the instant invention can be replaced with an equivalent amplifying element.

It is to be understood that the above described arrangements are illustrative of the application of the principles of the invention. Other arrangements may be devised by those skilled in the art without departing from the spirit and scope of the invention.

What is claimed is:

1. In a one core per bit shift register, two magnetic binary elements with transferee and transferor windings, a transfer circuit interposed between said elements comprising unidirectional flow means coupling the transferee winding of the first binary element with the transferor winding of the second element, a regeneratively activated transistor circuit which includes said transferee winding, and a delay circuit comprising a capacitor connected in parallel with said transferor winding and the unidirectional flow means.

2. A transfer circuit for a one core per bit shift register comprising two binary elements, means for applying clearing pulses to said binary elements, a winding associated with each of said binary elements, a unidirectional current flow member interposed between said windings, a capacitor delay circuit coupled in shunt with said windings, a regeneratively coupled transistor circuit including one of said windings, means for biasing the transistor circuit to cut-off during the period when an output signal is produced in the other of said windings in response to the clearing of a first of said binary elements, and means, including said capacitor delay circuit, for actuating said regeneratively coupled transistor circuit upon the removal of said biasing means, whereby switching energy is applied to the second of said binary elements through said transistor circuit so as to tend to switch said second binary element.

3. In a one core per bit shift register, two binary magnetic storage elements, means for applying a pulse to both elements so as to simultaneously clear said elements of their stored information, means for causing the output signal induced during the clearing of the first binary element to charge a capacitor, a regenerative circuit associated with said second binary element and adapted to supply switching energy to said second binary element, means for biasing said regenerative circuit beyond cut-off during the application of said clearing pulse, said regenerative circuit including a trigger winding coupling said capacitor to said regenerative circuit, said charge on said capacitor being operative to set off said regenerative circuit upon the removal of said bias so as to completely switch said second binary element.

4. In a one core per bit shift register, two binary elements containing stored information, means for applying a pulse to both elements so as to simultaneously clear said elements of their stored information, means for applying the output signal resulting from clearance of the first binary element as a potential to charge a capacitor, a regeneratively coupled transistor circuit magnetically coupled with said second binary element to switch the storage state to one predetermined position, means for biasing said transistor circuit to cut-off while said capacitor is being charged and until said second binary element is cleared, and means for employing said potential to initiate the triggering of said regeneratively coupled transistor circuit when the bias is removed.

5. In a one core per bit shift register, two binary cores, means for clearing said cores simultaneously, an output winding for producing a signal in response to the clearing of a first of said two binary cores, a trigger winding coupled to the second of said two cores, a rectifier interposed between the output winding and trigger winding, a series circuit comprising a transistor, a switching winding, and a D. C. source of potential connected to said switching winding and transistor, said trigger winding and switching winding being regeneratively coupled, a delay circuit connected between said output winding and trigger winding, means for biasing said transistor beyond cut-off during the clearing of both cores, means for storing the output signal of said first cleared core as a potential in said delay circuit, whereby when said transistor cut-off bias expires said stored potential causes said transistor to become conductive and apply switching potential to said second binary core.

6. In a one core per bit shift register; a transferor core and a transferee core each capable of assuming either of two stable states of magnetic remanence, one of which is a reference state; a transfer circuit coupling said cores, said transfer circuit comprising an output winding for said transferor core, an input winding for said transferee core, an asymmetrically conducting device connecting one end of said output winding to one end of said input winding, a storage capacitor connected in shunt across said asymmetrically conducting device and output winding serially connected, and a transistor having its input-circuit electrodes coupled between the other end of said input winding and the other end of said output winding, said asymmetrically conducting device being poled to offer low impedance to current flow into said capacitor in response to the voltage induced in said output winding when said transferor core switches to its reference state, thereby to charge said capacitor to a potential of a polarity tending to bias said transistor into conduction; means for applying a pulse voltage from an external source to said transfer circuit in time coincidence with said switching of said transferor core, said applied pulse voltage being of a polarity and magnitude to override said capacitor potential, thereby to maintain said transistor in non-conducting state during the period of switching of said transferor core to said reference state, said capacitor potential being effective upon termination of said overriding pulse voltage to turn on said transistor; and a second winding coupled to said transferee core and connected in the output circuit of said transistor and so poled as to be regeneratively coupled to said input winding for maintaining conduction of said transistor for a sufficient period to completely switch said transferee core.

7. Apparatus as claimed in claim 6 characterized in that said transferee core has a read-out winding coupled thereto through which current is driven to switch said core to its reference state, and further characterized in that said read-out and input windings are wound in such sense relative to each other that the voltage induced in said input winding when said transferee core switches to its reference state is of a polarity to bias off said transistor.

8. Apparatus as claimed in claim 6 characterized in that one of said input-circuit electrodes of said transistor is coupled to said other end of said output winding by means of a resistor, and in that said pulse voltage from said external source is applied across said resistor.

9. Apparatus as claimed in claim 8 characterized in that a resistor is connected in series with said capacitor in shunt with said asymmetrically conducting device and output winding.

10. Apparatus as claimed in claim 9 characterized in that said other end of said input winding is connected directly to the base electrode of said transistor.

References Cited in the file of this patent

UNITED STATES PATENTS

| | | |
|---|---|---|
| 2,652,501 | Wilson | Sept. 15, 1953 |
| 2,710,928 | Whitney | June 14, 1955 |
| 2,760,088 | Pittman et al. | Aug. 21, 1956 |
| 2,772,370 | Bruce et al. | Nov. 27, 1956 |